(12) United States Patent
Peebles et al.

(10) Patent No.: US 9,637,259 B2
(45) Date of Patent: May 2, 2017

(54) RACETRACK COLLATOR, CARRIAGE AND RELATED METHODS

(71) Applicant: KHS GmbH, Dortmund (DE)

(72) Inventors: Scott Peebles, Bradenton, FL (US); Jason Kobata, Sarasota, FL (US)

(73) Assignee: KHS GmbH, Juchostrasse, Dortmund (DE)

(*) Notice: Subject to any disclaimer, the term of this patent is extended or adjusted under 35 U.S.C. 154(b) by 0 days.

(21) Appl. No.: 14/696,618

(22) Filed: Apr. 27, 2015

(65) Prior Publication Data
US 2016/0311629 A1 Oct. 27, 2016

(51) Int. Cl.
| | |
|---|---|
| *B65B 35/44* | (2006.01) |
| *B65G 37/00* | (2006.01) |
| *B65G 47/26* | (2006.01) |
| *B65B 35/24* | (2006.01) |
| *B65G 17/42* | (2006.01) |
| *B65B 59/00* | (2006.01) |
| *B65G 17/32* | (2006.01) |
| *B65G 47/08* | (2006.01) |
| *B65G 15/42* | (2006.01) |
| *B65G 17/46* | (2006.01) |

(52) U.S. Cl.
CPC ............. *B65B 35/44* (2013.01); *B65B 35/24* (2013.01); *B65B 59/005* (2013.01); *B65G 17/326* (2013.01); *B65G 17/42* (2013.01); *B65G 47/082* (2013.01); *B65G 47/268* (2013.01); *B65G 15/42* (2013.01); *B65G 17/46* (2013.01); *B65G 37/005* (2013.01)

(58) Field of Classification Search
CPC .......... B65B 35/24; B65B 35/44; B65G 17/42; B65G 47/268; B65G 17/32; B65G 37/005
See application file for complete search history.

(56) References Cited

U.S. PATENT DOCUMENTS

| | | | | |
|---|---|---|---|---|
| 3,954,165 | A | * 5/1976 | Snyder | B65B 35/44 198/418.4 |
| 3,996,723 | A | * 12/1976 | Greenwell | B65B 5/101 414/792.5 |
| 4,398,383 | A | 8/1983 | Prakken | |
| 4,489,533 | A | * 12/1984 | Treiber | B65G 47/244 198/345.1 |
| 4,583,351 | A | 4/1986 | Fallas | |
| 4,864,801 | A | 9/1989 | Fallas | |

(Continued)

FOREIGN PATENT DOCUMENTS

| | | |
|---|---|---|
| DE | 29607058 | 8/1996 |
| DE | 19822269 | 11/1999 |

(Continued)

*Primary Examiner* — Thomas Randazzo
(74) *Attorney, Agent, or Firm* — Allen Dyer Doppelt & Gilchrist

(57) ABSTRACT

A racetrack collator includes a collator frame, first and second collator drive assemblies and first and second collator carriages. The collator frame defines a racetrack travel path, and the first and second drive assemblies are each mounted thereto. Each drive assembly includes a respective endless drive element extending around the racetrack travel path. Each collator carriage is releasably connected to a respective endless drive element and includes a flexible substrate to which a plurality of dividers are connected.

19 Claims, 4 Drawing Sheets

(56) References Cited

U.S. PATENT DOCUMENTS

| | | | | |
|---|---|---|---|---|
| 5,044,876 | A | * | 9/1991 | Stohlquist ............ B65G 47/082 198/419.3 |
| 5,209,046 | A | | 5/1993 | Tapscott et al. |
| 5,311,722 | A | * | 5/1994 | Staton .................. B65G 47/082 53/247 |
| 5,339,606 | A | * | 8/1994 | Benz ....................... B65B 5/106 53/150 |
| 5,495,932 | A | | 3/1996 | Dyess |
| 5,885,055 | A | * | 3/1999 | Wojtalewicz ........ B65G 57/035 414/790.4 |
| 6,260,689 | B1 | * | 7/2001 | Takemoto ............... B65B 5/064 198/419.3 |
| 6,298,980 | B1 | | 10/2001 | Totani |
| 6,382,401 | B2 | * | 5/2002 | Takemoto ............... B65B 5/064 198/419.3 |
| 6,691,856 | B1 | * | 2/2004 | Prakken ................ B65G 17/26 198/419.3 |
| 6,694,706 | B1 | | 2/2004 | Odenthal et al. |
| 6,823,981 | B2 | | 11/2004 | Ogle et al. |
| 6,925,784 | B2 | | 8/2005 | Escobar et al. |
| 7,159,375 | B2 | | 1/2007 | Hellmann et al. |
| 7,475,771 | B2 | | 1/2009 | Schmetzer |
| 8,490,775 | B2 | * | 7/2013 | Volk ....................... B65G 17/26 198/419.3 |
| 2002/0148203 | A1 | | 10/2002 | Waddell et al. |
| 2003/0136086 | A1 | | 7/2003 | Kalany et al. |
| 2014/0260113 | A1 | * | 9/2014 | Thompson ................ B65B 5/08 53/475 |
| 2015/0251785 | A1 | * | 9/2015 | Canini .................. B65B 25/146 53/209 |

FOREIGN PATENT DOCUMENTS

| | | |
|---|---|---|
| DE | 202004005723 | 9/2005 |
| EP | 533309 | 3/1993 |
| EP | 0798210 | 1/1997 |
| EP | 0949063 | 10/1999 |
| EP | 2433872 | 3/2012 |

\* cited by examiner

RACETRACK COLLATOR, CARRIAGE AND RELATED METHODS

FIELD OF THE INVENTION

The present invention relates to racetrack collators for use in packaging applications.

BACKGROUND OF THE INVENTION

Racetrack collators are used in the packaging industry for collecting a predetermined number of pouches, packets or other items fed to it in series at a loading point and then moving the predetermined number of items in parallel to an unloading point. Frequently, the items are individually received from a horizontal conveyor at the loading point and commonly placed into a box, carton or other container at the unloading point.

A racetrack collator typically has two sets of dividers, with each set mounted to its own belt, chain or other endless drive element. The two endless drive elements travel adjacent to one another about the collator, with each set of dividers also straddling the other drive element so that all the dividers travel within the same racetrack travel path about the collator. The drive elements are driven such that, as soon as one set of dividers is unloaded at the unloading point, that set "races" back around to the loading point to be ready to receive items without interruption when the other set of dividers is done loading and moved to the unloading point.

When changes are made to the packaging line in which a racetrack collator is utilized, it is sometimes necessary to adjust the racetrack collator, as well. For instance, if a different number of items are to be loaded into a container, it may be necessary to change the number of dividers mounted to the endless drive elements. If items of a different size are to be handled, it may be necessary to change the pitch of (i.e., the spacing between) the dividers. Adjustments such as these can require extensive disassembly of the racetrack collator, as well as replacement of the endless drive elements and other drive components. This, in turn, can result in longer downtime of the packaging line.

While racetrack collators are effective components of a packaging line, further improvements are possible.

SUMMARY OF THE INVENTION

In view of the foregoing, it is an object of the present invention to provide an improved racetrack collator, a removable carriage for use therewith, and related methods. According to an embodiment of the present invention, a racetrack collator includes a collator frame, first and second collator drive assemblies and first and second collator carriages. The collator frame defines a racetrack travel path, and the first and second drive assemblies are each mounted thereto. Each drive assembly includes a respective endless drive element extending around the racetrack travel path. Each collator carriage is releasably connected to a respective endless drive element and includes a flexible substrate to which a plurality of dividers are connected.

According to an aspect of the present invention, the collator frame includes a carriage guide maintaining the first and second collator carriages in the racetrack travel path during movement of the first and second endless drive elements. The carriage guide can include one or more removable segments to facilitate loading and removal of the collator carriages. The carriage guide can also include opposite side sections which engage guide slots defined on opposite sides of the collator carriages.

According to another aspect of the present invention, each collator carriage further includes a plurality of divider mounting bars, each of which is connected to a corresponding divider through the flexible substrate. Opposite ends of the divider mounting bars can collectively define the guide slots.

According to a further aspect of the present invention, each collator carriage only connects to its respective endless drive element along a leading edge of the carriage. Threaded fasteners can be inserted through the leading edge divider and divider mounting bar to releasably engage the endless drive element.

According to a method aspect, a method of adjusting a racetrack collator includes removing a collator carriage from an endless drive element of the racetrack collator, and connecting a different collator carriage to the endless drive element in place of the removed one. The divider configuration of the carriages can differ with respect to at least a divider pitch or a divider quantity.

These and other objects, aspects and advantages of the present invention will be better appreciated in view of the drawings and following detailed description of preferred embodiments.

DETAILED DESCRIPTION OF PREFERRED EMBODIMENTS

Figure 1:
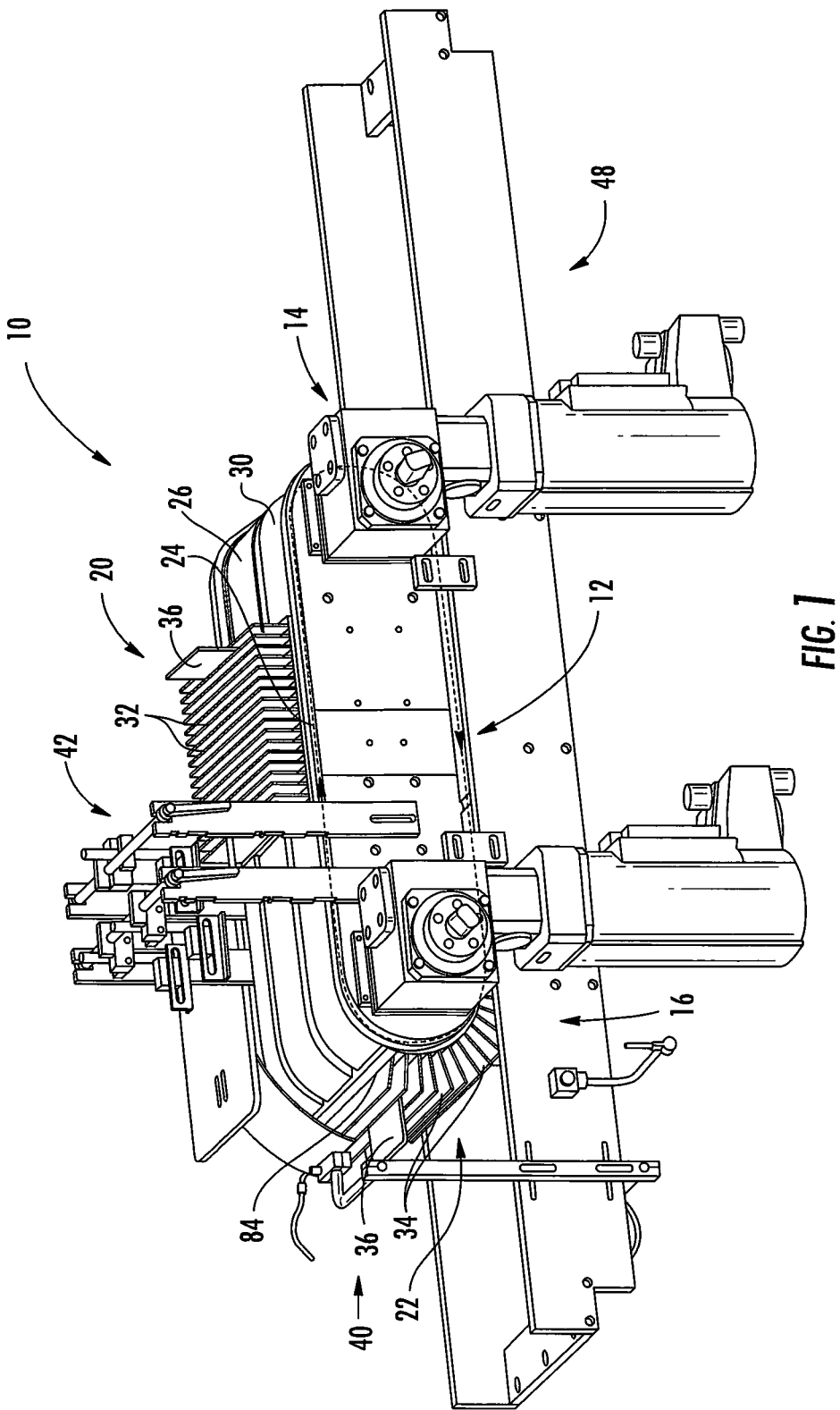
FIG. 1 is a perspective view of a racetrack collator, including a pair of removable collator carriages mounted to respective endless drive elements, according to an embodiment of the present invention, along with adjacent supporting structure.
Figure 2:
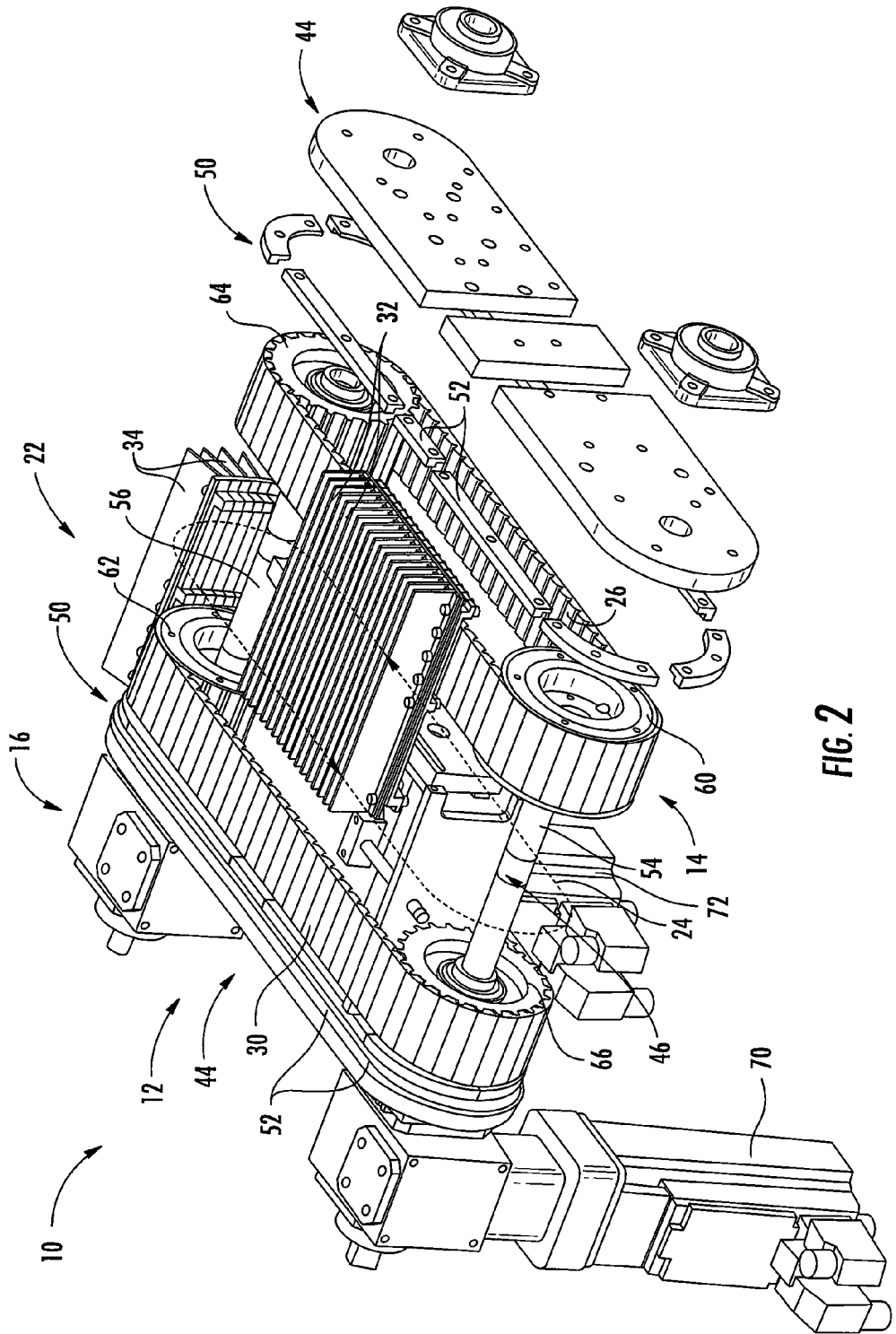
FIG. 2 is partially exploded perspective view of the racetrack collator of FIG. 1.

Referring to FIGS. 1 and 2, according to an embodiment of the present invention, a racetrack collator 10 includes a collator frame 12, first and second collator drive assemblies 14, 16, and first and second collator carriages 20, 22. The collator frame 12 defines a racetrack travel path 24. The first and second drive assemblies 14, 16, mounted to the collator frame 12, each include an endless drive element 26, 30 extending around the racetrack travel path 24. The first and second collator carriages 20, 22 each include a plurality of flexibly connected dividers 32, 34, and are releasably connected to the endless drive elements 26, 30, respectively. The drive assemblies 14, 16 are operable to drive the endless drive elements 26, 30 so as to position the collator carriages 20, 22 to serially receive items 36 at a loading point 40 and move the items 36 for unloading in parallel at an unloading point 42. As will be explained in greater detail below, the collator carriages 20, 22 are easily removable and replaceable.

The collator frame 12 includes side frame sections 44 joined by a center frame section 46. The collator frame 12 supports the drive assemblies 14, 16 in a spaced relationship to define the general extent of the racetrack travel path 24. The collator frame 12 mounts to supporting structure 48 associated with a packaging line. The collator frame 12 also includes a carriage guide 50, preferably located on the side frame sections 44 around the travel path 24. The carriage guide 50 engages the collator carriages 20, 22 to maintain them in the racetrack travel path 24 while the collator carriages 20, 22 are moved by the endless drive elements 26, 30.

Advantageously, the carriage guide 50 has two opposed side sections corresponding to the side frame sections 44, each of which is composed of one or more removable segments 52. Removal of such segment(s) 52 facilitates removal and installation of the collator carriages 20, 22. The side frame sections 44 can themselves be formed of a plurality of removable segments, which could be removed with, or separately from, carriage guide segments 52. In some embodiments, the carriage guide 50 could be formed integrally with the side frame sections 44.

The first and second collator drive assemblies 14, 16 further include respective drive shafts 54, 56, drive pulleys 60, 62 and freewheeling pulleys 64, 66. Advantageously, the drive shafts 54, 56 are driven by respective servomotors 70, 72. The drive shaft 54 of the first collator drive assembly 14 carries the drive pulley 60 for the endless drive element 26 as well as the freewheeling pulley 66 for the endless drive element 30. The drive shaft 56 of the second collator drive assembly 16 carries the drive pulley 62 for the endless drive element 30 as well as the freewheeling pulley 66 for the endless drive element 26. In each case, the drive pulley 60, 62 is rigidly connected to its respective drive shaft 54, 56, and turns therewith when driven by the respective servomotor 70, 72. Each freewheeling pulley 64, 66 is freely rotatable relative to the respective drive shaft 56, 54 on which it is mounted, and so rotates only with its respective drive pulley 60, 62 via movement of its respective endless drive element 26, 30.

Figure 3:
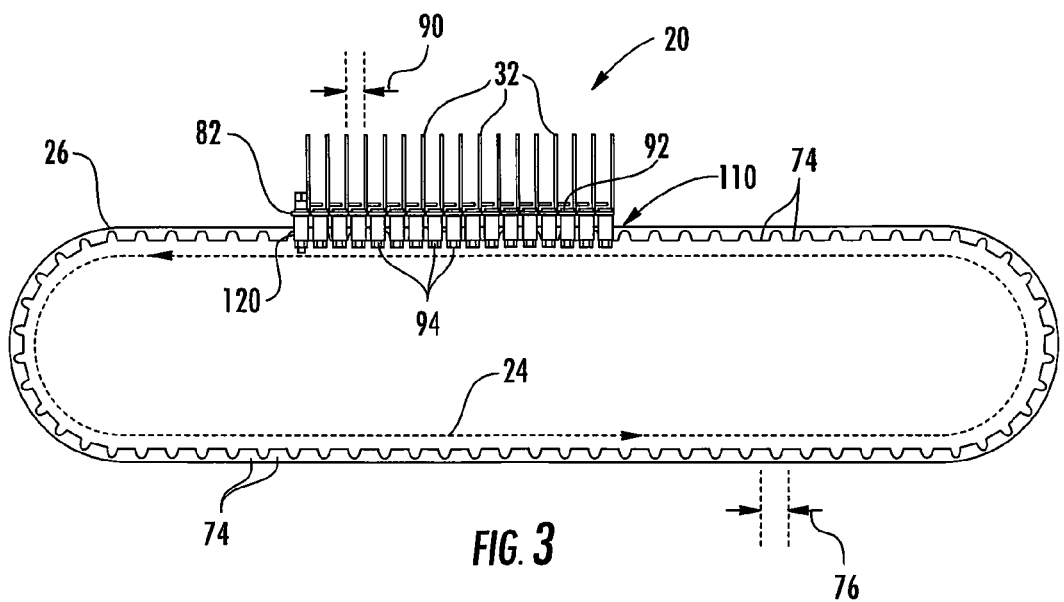
FIG. 3 is a side view of a representative one of the collator carriages of FIG. 1 and its respective endless drive element.
Figure 4:
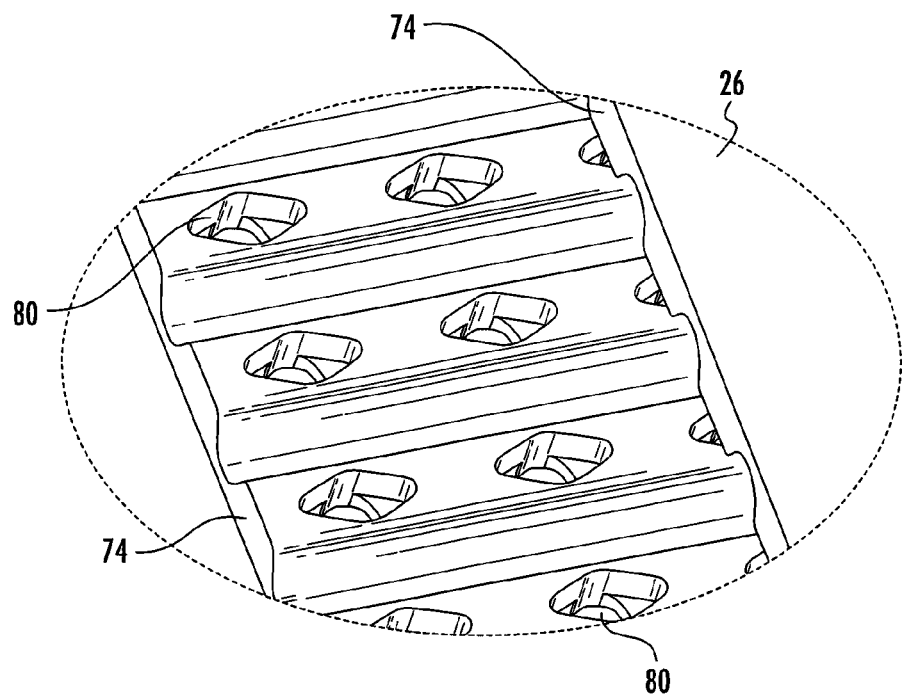
FIG. 4 is a detail view of a portion of the endless drive element of FIG. 3.

Preferably, the endless drive elements 26, 30 are substantially identical. In FIGS. 3 and 4, only the endless drive element 26 is shown for economy of illustration. The endless drive element 26 (30) includes a plurality of segments separated by a segment pitch 76, which is preferably uniform. In the depicted embodiment, the endless drive element 26 (30) is a toothed drive belt, but other drive elements—segmented or otherwise—could be employed, such as a drive chain. In the endless drive element 26 (30), preformed recesses 80 extend into the segments 74 from an interior surface thereof. On at least one of the segments 74, mounting hardware for connection to the collator carriage 20 (22) is accommodated within the recesses 80.

Figure 5:
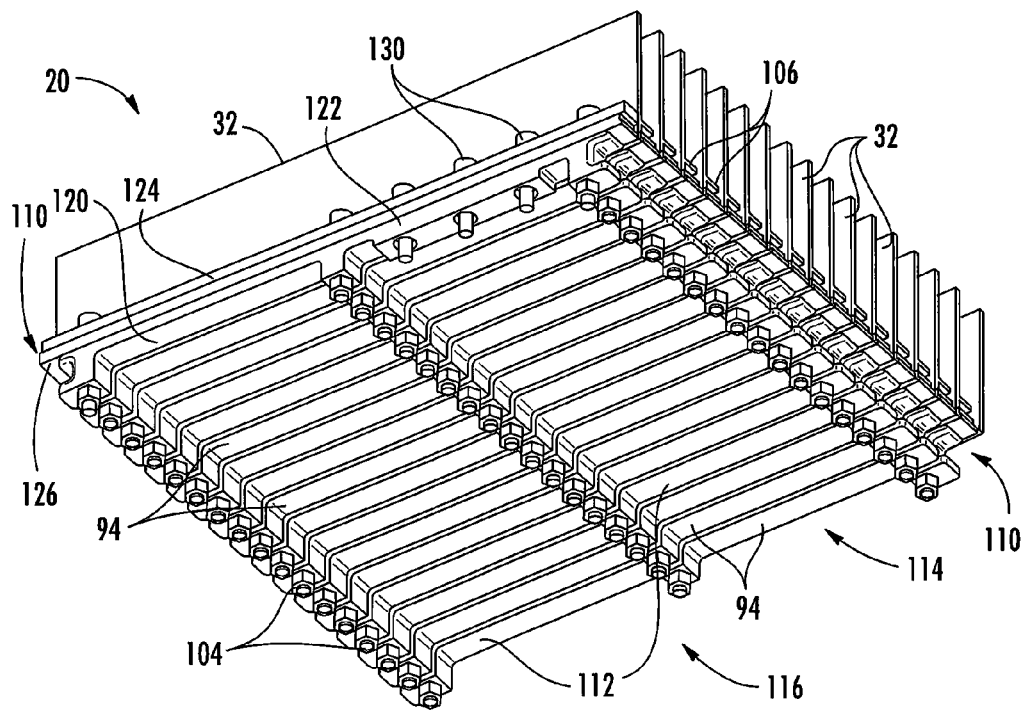
FIG. 5 is a perspective view of the collator carriage of FIG. 3.
Figure 6:
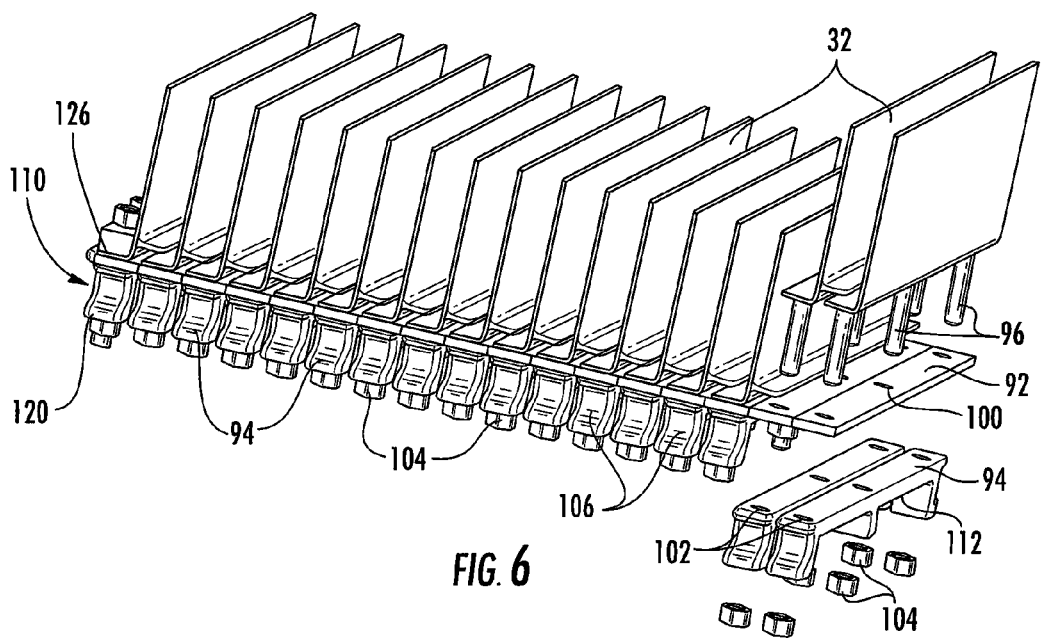
FIG. 6 is a partially exploded perspective view of the collator carriage of FIG. 3.

The collator carriages 20, 22 are substantially identical in structure, differing only in where the connection with the respective endless drive element 26, 30 is made; the collator carriage 20 connecting along the left side of its leading edge 82 and the collator carriage 22 connecting along the right side of its leading edge 84. The collator carriages 20, 22 being otherwise identical, only the carriage 20 is shown in FIGS. 3, 5 and 6. As seen in FIGS. 3, 5 and 6, the collator carriage 20 (22) includes the plurality of dividers 32 (34) separated by a divider pitch 90, preferably uniform, commonly connected to a flexible substrate 92. With the collator carriage 20 (22) only connected to the endless drive element 30 (32) along its leading edge 82 (84), the divider pitch 90 is completely independent of the segment pitch 76, meaning that the divider pitch 90 does not have to equal the segment pitch 76 or be a whole number multiple thereof.

The collator carriage 20 (22) further includes a plurality of mounting bars 94, each connected to a respective one of the dividers 32 (34) through the flexible substrate 92. Threaded posts 96 extending from lower ends of each divider 32 (34) extend through aligned openings 100, 102 in the flexible substrate 92 and mounting bars 94. Nuts 104 or the like thread onto the posts 96 under the mounting bars 94 to secure the connection.

Recesses 106 defined in opposite ends of each of the mounting bars 94 collectively define guide slots 110 extending along opposite sides of the collator carriage 20 (22). The guide slots 110 engage the opposite side sections of the carriage guide 50 to help maintain the collator carriage 20 (22) in the racetrack travel path 24 (see FIG. 2). While in the depicted embodiment, the carriage guide 50 protrudes into the guide slots 110, the relative position of these elements could be changed within the scope of the invention, such that protrusions formed on the collator carriages engaged slots defined into the collator frame 12. Additionally, undersides of the each mounting bar 94 define drive element recesses 112, which collectively define passages 114, 116 for the endless drive elements 20, 22, respectively.

A leading edge mounting bar 120 is connected proximate the leading edge 82. The mounting bar connected along the leading edge 84 would be the mirror image of the mounting bar 120, and in fact could be the exact same bar installed backwards. A protrusion 122 extends below the leading edge mounting bar 120 to firmly engage the endless drive element 26 (30) when the collator carriage 20 (22) is connected. A leading edge reinforcement bar 124 overlies the foot of the divider 32 (34) corresponding to the leading edge mounting bar 120, and a leading edge sheath 126 ensconces the leading edge 82 (84) and is sandwiched between the divider 32 and the leading edge mounting bar 120. A plurality of threaded fasteners 130, such as machine screws, extend through aligned openings in the reinforcement bar 124, the divider 32 foot, the sheath 126, the flexible substrate 92, and the leading edge mounting bar 120 and its protrusion 122. The threaded fasteners 130 are received into the complementary threaded fasteners installed in the preformed recesses 80 in one of the segments 74 of the endless drive element 26 (30).

In operation, the racetrack collator 10 operates like conventional racetrack collators. When the racetrack collator 10 is to be adjusted to change the configuration of dividers 32, 34 (on either or both collator carriage 20, 22), the threaded fasteners 130 are withdrawn to disconnect the collator carriages 20, 22 from their respective endless drive elements 26, 30. Segments 52 of the carriage guide 50 are removed (advantageously, the top, center segments 52), and the collator carriages 20, 22 are slid out of the guide 50 and off the racetrack collator 10. Differently configured collator carriages 20, 22 (or similarly configured, in the event of a replacement due to breakage or other problem) are slid back onto the guide 50 and fastened onto the endless drive elements 26, 30 with the threaded fasteners 130. The carriage guide segments 52 are replaced and the racetrack collator 10 is ready to resume operation.

From the foregoing description, it will be appreciated that a racetrack collator, with removable collator carriages, according to the present invention allows much faster and easier adjustment of divider configuration, including divider quantity and/or pitch, resulting in quicker modification to handle different item configurations and reduced packaging line down time. It will be further understood that the embodiments depicted and described are for provided for exemplary and illustrative purposes; the present invention is not necessarily limited thereto. Rather, those skilled in the art will appreciate that various modifications, as well as adaptations to particular circumstances, will fall within the scope of the invention herein shown and described, and of the claims appended hereto.

What is claimed is:

1. A racetrack collator comprising:
   a collator frame defining a racetrack travel path;
   a first collator drive assembly mounted to the collator frame and including a first endless drive element extending around the racetrack travel path;
   a second collator drive assembly mounted to the collator frame and including a second endless drive element extending around the racetrack travel path;
   a first collator carriage releasably connected to the first endless drive element and including a first plurality of dividers, the first plurality of dividers being flexibly connected independently of the first endless drive element; and
   a second collator carriage releasably connected to the second endless drive element and including a second plurality of dividers, the second plurality of dividers being flexibly connected independently of the second endless drive element;
   wherein the first collator carriage further includes a first flexible substrate and a first plurality of divider mounting bars, each of the first plurality of divider mounting bars connected to a corresponding one of the first plurality of dividers through the first flexible substrate; and
   wherein the second collator carriage further includes a second flexible substrate and a second plurality of divider mounting bars, each of the second plurality of divider mounting bars connected to a corresponding one of the second plurality of dividers through the second flexible substrate.

2. The racetrack collator of claim 1, wherein the first and second endless drive elements are releasably connected, respectively, to the first and second collator carriages only along respective leading edges of the first and second collator carriages.

3. The racetrack collator of claim 2, wherein a plurality of threaded fasteners inserted through the respective leading edges releasably connect the first and second collator carriages to the first and second endless drive elements, respectively.

4. The racetrack collator of claim 1, wherein the first collator drive assembly further includes a first drive shaft, a first drive pulley and a first freewheeling pulley;
   wherein the second collator drive assembly further includes a second drive shaft, a second drive pulley and a second freewheeling pulley; and
   wherein the first drive pulley and the second freewheeling pulley are mounted on the first drive shaft and the second drive pulley and the first freewheeling pulley are mounted on the second drive shaft, the first drive and freewheeling pulleys engaging the first endless drive, and the second drive and freewheeling pulleys engaging the second endless drive.

5. The racetrack collator of claim 4, wherein the first collator drive assembly further includes a first servomotor operable to turn the first drive shaft; and
   wherein the second collator drive assembly further includes a second servomotor operable to turn the second drive shaft.

6. The racetrack collator of claim 1, wherein the first and second endless drive elements each include a plurality of segments having a segment pitch therebetween.

7. The racetrack collator of claim 6, wherein a divider pitch of the first and second plurality of dividers is independent of the segment pitch.

8. The racetrack collator of claim 6, wherein the first and second endless drive elements are toothed drive belts.

9. The racetrack collator of claim 1, wherein the collator frame includes a carriage guide maintaining the first and second collator carriages in the racetrack travel path during movement of the first and second endless drive elements.

10. The racetrack collator of claim 9, wherein the carriage guide includes at least one removable segment for facilitating installation and removal of the first and second collator carriages.

11. The racetrack collator of claim 9, wherein the carriage guide includes opposed side sections for engaging opposite sides of the first and second collator carriages.

12. The racetrack collator of claim 11, wherein the first and second collator carriages each define guide slots along the opposite sides thereof, the guide slots being engaged by the opposed side sections of the carriage guide.

13. The racetrack collator of claim 12,
   wherein the guide slots are collectively defined by opposite ends of the first and second pluralities of divider mounting bars.

14. A removable collator carriage for a racetrack collator, the removable collator carriage comprising:
   a flexible substrate having opposed first and second surfaces extending between first and second ends and first and second sides;
   a plurality of dividers extending away from the first surface perpendicular to the first and second sides; and
   a plurality of divider mounting bars extending away from the second surface perpendicular to the first and second sides, each of the plurality of divider mounting bars being connected to a corresponding one of the plurality of dividers through the flexible substrate.

15. The removable collator carriage of claim 14, wherein first and second side slots extending along the first and second sides are collectively defined by opposite ends of the plurality of divider mounting bars.

16. The removable collator carriage of claim 14, wherein one of the plurality divider mounting bars and the corresponding one of the plurality of dividers adjacent the first end of the flexible substrate have at least one mounting hole defined extending therethrough for connection to an endless drive element of a racetrack collator.

17. A method of adjusting a racetrack collator, the method comprising:
   removing a first collator carriage from an endless drive element of the racetrack collator, the first collator carriage including a first plurality of dividers in a first configuration respectively connected through a first flexible substrate to a corresponding plurality of divider mounting bars such that the first plurality of dividers are flexibly attached independently of the endless drive element; and
   connecting a second collator carriage to the endless drive element in place of the first collator carriage, the second collator carriage having a second plurality of dividers in a second configuration respectively connected through a second flexible substrate to a corresponding plurality of divider mounting bars such that the second plurality of dividers are flexibly attached independently of the endless drive element.

18. The method of claim 17, wherein the first and second configurations differ in at least one of: a divider pitch; and a divider quantity.

19. The method of claim 17, wherein removing the first collator carriage includes detaching a leading edge thereof from the endless drive element and removing a segment of a carriage guide from a collator frame; and wherein connecting the second collator carriage includes attaching a leading edge thereof to the endless drive element and reinstalling the segment of the carriage guide.

\* \* \* \* \*